United States Patent
Bai et al.

(10) Patent No.: US 10,534,878 B1
(45) Date of Patent: Jan. 14, 2020

(54) CIRCUIT PLACE AND ROUTE OPTIMIZATION BASED ON PATH-BASED TIMING ANALYSIS

(71) Applicant: Avatar Integrated Systems, Inc., Santa Clara, CA (US)

(72) Inventors: Geng Bai, Fremont, CA (US); Chao-Yung Wang, Taipei (TW); Ping-San Tzeng, Fremont, CA (US)

(73) Assignee: Avatar Integrated Systems, Inc., Santa Clara, CA (US)

( * ) Notice: Subject to any disclaimer, the term of this patent is extended or adjusted under 35 U.S.C. 154(b) by 48 days.

(21) Appl. No.: 15/793,622

(22) Filed: Oct. 25, 2017

(51) Int. Cl.
*G06F 17/50* (2006.01)
*G01R 31/28* (2006.01)

(52) U.S. Cl.
CPC ..... *G06F 17/5031* (2013.01); *G01R 31/2882* (2013.01); *G06F 17/505* (2013.01); *G06F 2217/84* (2013.01)

(58) Field of Classification Search
CPC ............... G06F 17/5031; G06F 17/505; G06F 2217/84; G01R 31/2882
See application file for complete search history.

(56) References Cited

U.S. PATENT DOCUMENTS

| | | | |
|---|---|---|---|
| 6,591,407 B1 | 7/2003 | Kaufman | |
| 8,079,004 B2 | 12/2011 | Soviani | |
| 8,281,275 B2 | 10/2012 | Tirumala | |
| 8,332,802 B2 | 12/2012 | Haugestuen | |
| 8,788,995 B1 * | 7/2014 | Kumar | G06F 17/5031 716/110 |
| 8,806,413 B2 * | 8/2014 | Shaikh | G06F 17/5031 716/113 |
| 8,863,052 B1 | 10/2014 | Dhuria | |
| 9,589,096 B1 | 3/2017 | Gupta | |
| 9,875,333 B1 | 1/2018 | Verma | |
| 9,881,123 B1 | 1/2018 | Goyal | |
| 10,002,225 B2 * | 6/2018 | Wrixon | G06F 17/5031 |
| 10,031,986 B1 | 7/2018 | Kumar | |
| 10,037,394 B1 | 7/2018 | Kulshreshtha | |
| 10,192,015 B2 * | 1/2019 | Kim | G06F 17/505 |
| 2014/0082576 A1 | 3/2014 | Shaikh | |
| 2016/0070844 A1 * | 3/2016 | Shyamsukha | G06F 17/5081 716/113 |
| 2016/0216316 A1 | 7/2016 | Kim | |
| 2016/0283643 A1 | 9/2016 | Kim | |
| 2016/0364505 A1 | 12/2016 | Kim | |
| 2017/0004249 A1 | 1/2017 | Feng | |
| 2018/0210986 A1 | 7/2018 | Wu | |

* cited by examiner

*Primary Examiner* — Naum Levin
(74) *Attorney, Agent, or Firm* — Van Pelt, Yi & James LLP

(57) ABSTRACT

A graph-based analysis (GBA) output is obtained comprising timing information pertaining to a plurality of paths in an integrated circuit. A path-based analysis (PBA) is performed on the GBA output to analyze timing of the plurality of paths and generate a set of improved timing results; wherein the physical measurements used by the PBA are more accurate than the physical measurements used by the GBA. The PBA result is output to an optimizer to automatically adjust the circuit.

20 Claims, 9 Drawing Sheets

PBA Analysis:
· Separate Path Analysis for A-O and B-O paths.
· AO = AOpba
· BO = BOpba GBA Analysis:
· Simplistic Worst Case Analysis Identical for all Paths.
· O = max (AOpba, BOpba)

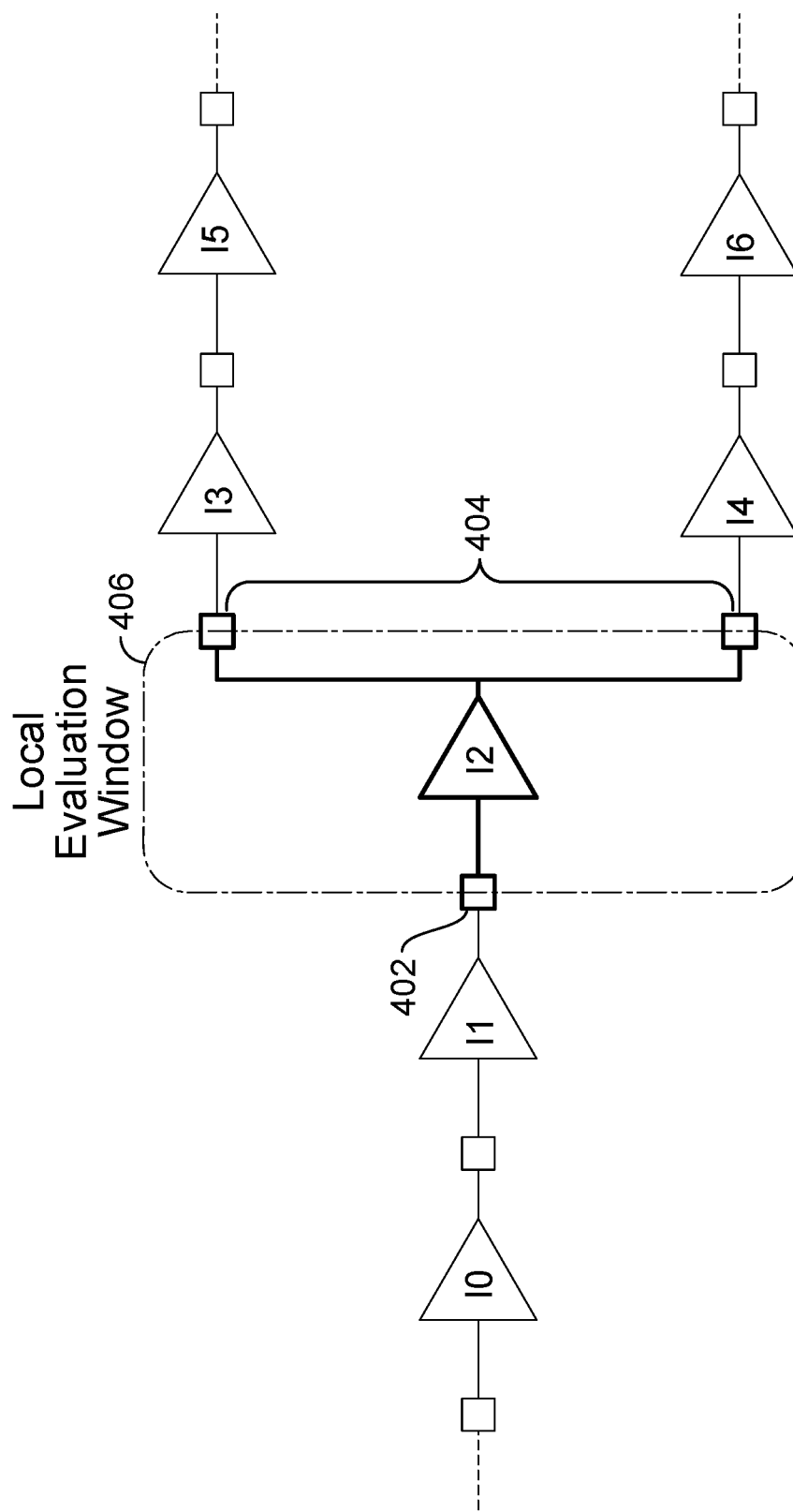

CIRCUIT PLACE AND ROUTE OPTIMIZATION BASED ON PATH-BASED TIMING ANALYSIS

BACKGROUND OF THE INVENTION

As suggested by Moore's law, semiconductor technology shrinks to a smaller geometry every few years. This reduction in geometry may increase process variation, and such variation may cause larger behavior change in a given circuit.

Timing analysis is an important verification step for modern integrated circuit design, as it provides assurance that a design remains consistent even with process variation and corresponding behavior change. Often a result in timing analysis verification indicates a failure in timing, requiring a redesign of the circuit.

BRIEF DESCRIPTION OF THE DRAWINGS

Various embodiments of the invention are disclosed in the following detailed description and the accompanying drawings.

FIG. 4 is an illustration of a local evaluation window. The local

DETAILED DESCRIPTION

Figure 1:
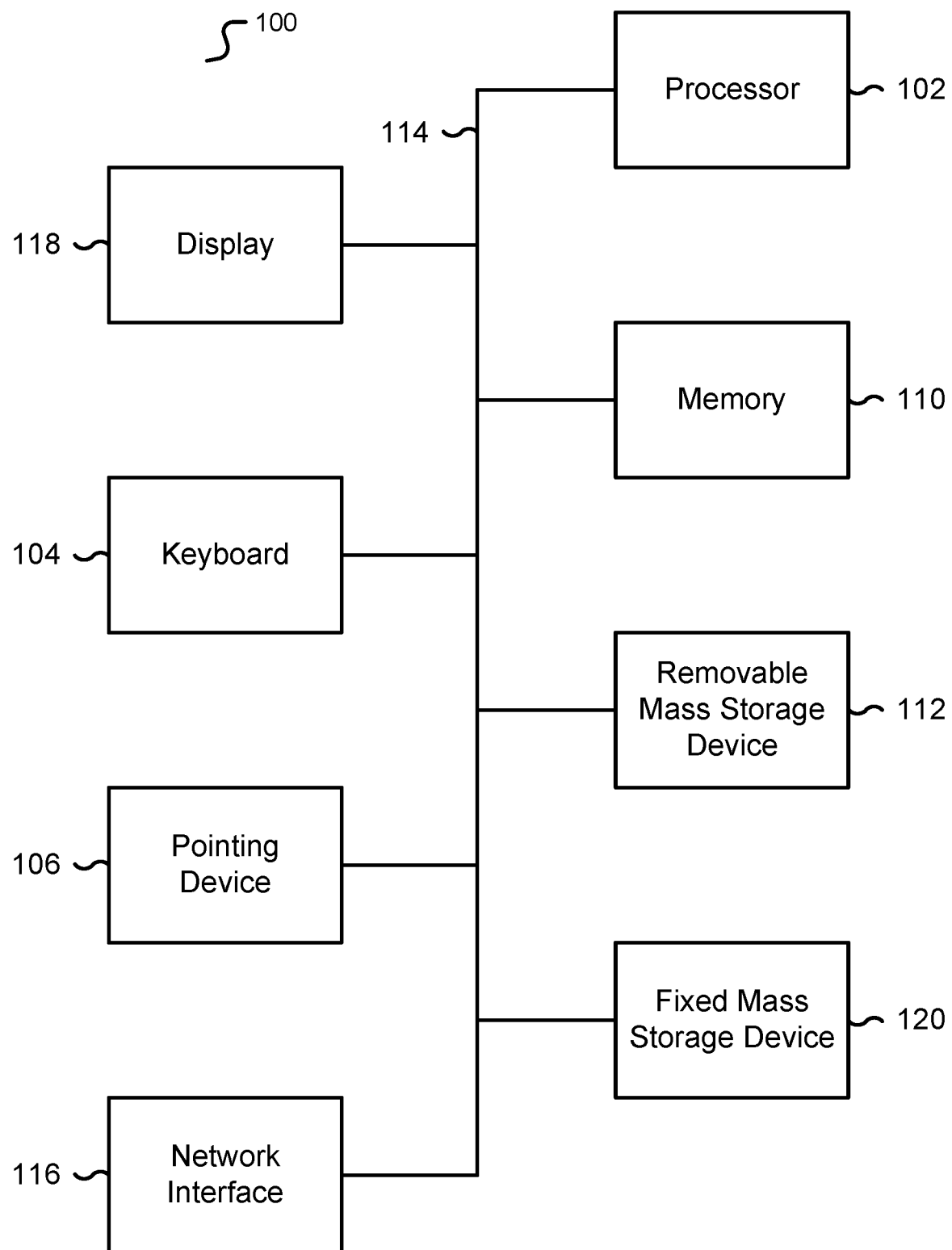
FIG. 1 is a functional diagram illustrating a programmed computer/server system for place and route in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a path-based timing analysis (PBA) for circuit place and route optimization is disclosed. Circuit design includes an iterative cycle between a first step of place and route automation and/or optimization and a second step of verification. Traditionally, static timing analysis (STA) is part of the second step of verification, using either graph-based timing analysis (GBA) or PBA; GBA is fast to perform but conservative while PBA is more accurate but slower to perform. Incorporating PBA instead into the first step of place and route optimization is disclosed, enabling designers to improve performance in their circuits with faster speed, lower power consumption and/or smaller area with little extra memory and/or CPU overhead. An incremental PBA analysis algorithm is disclosed that reduces elapsed time for a PBA flow run from the traditional 10× of the elapsed time for a GBA flow run to a practical ~2.8× of the elapsed time for a GBA flow run. The disclosed incremental PBA analysis algorithm may be embedded into general place and route tools for timing, power, and area optimization.

FIG. 1 is a functional diagram illustrating a programmed computer/server system for place and route in accordance with some embodiments. As shown, FIG. 1 provides a functional diagram of a general purpose computer system programmed to provide place and route in accordance with some embodiments. As will be apparent, other computer system architectures and configurations can be used for place and route.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

STA is an important verification step for modern ASIC design. A designer uses STA to verify the expected timing behaviors of the circuit. Inside an STA engine, there are two basic approaches, GBA and PBA. GBA performs a linear traverse through the circuit graph and computes the worst timing results, or slack, at each endpoint in the circuit. The GBA approach is fast and provides conservative results compared to actual physical circuit operation behavior. By providing conservative results, the GBA engine may introduce pessimism into its final timing results. Such a conservative margin may become expensive for a designer, who may have to increase power consumption budgets, increase area, and/or reduce speed for a given design.

Recently some circuit designers have added a PBA analysis in their timing verification step. PBA may be performed after GBA to remove unwanted pessimism. Starting from an endpoint with timing violation, or negative slack, a core PBA engine may extract a set of paths from GBA results in a non-increasing order of criticality and apply a path-specific timing update to each of these paths. The PBA result, or slack, for a specific path will typically be equal or better than the GBA result. Many paths with negative slack from a GBA become positive in the PBA domain, leaving more room for power and/or area optimization. The power and/or area optimization based on PBA results typically produce designs with smaller power consumption and smaller silicon area.

Figure 2A:
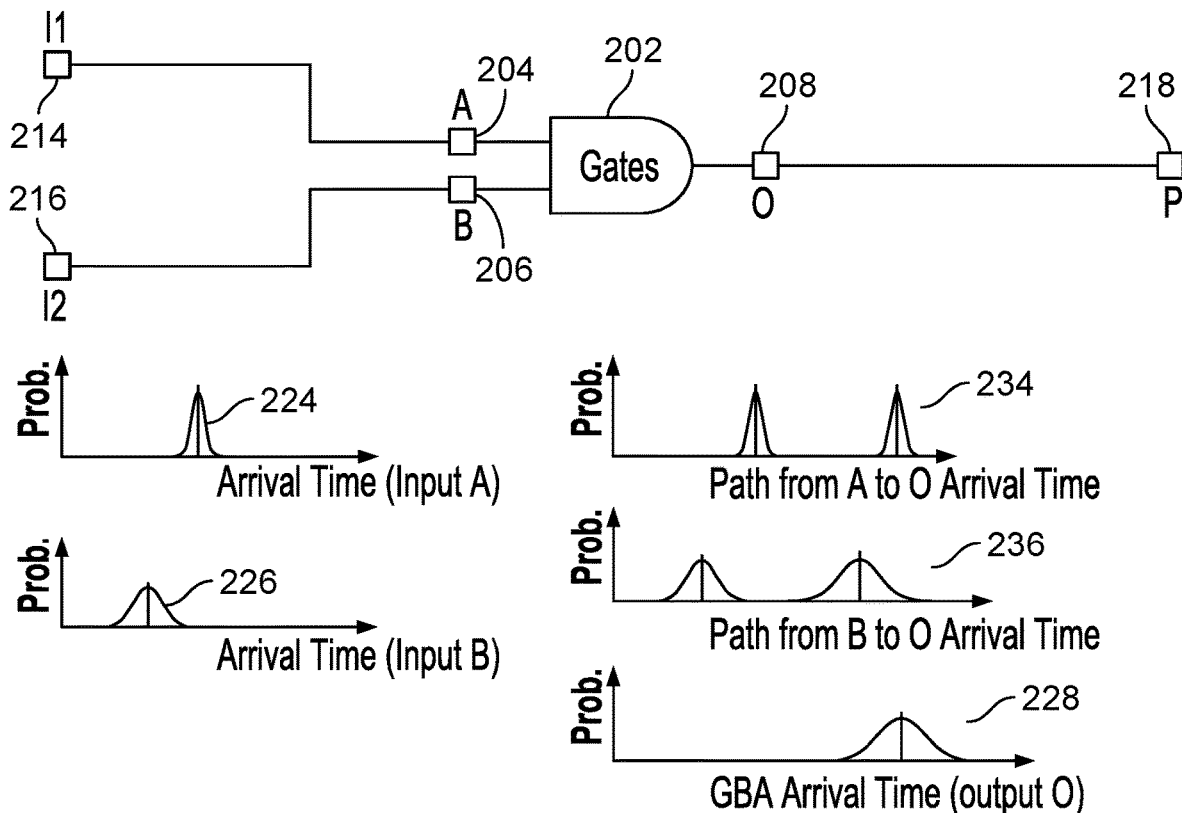
FIG. 2A is an illustration of a sample circuit and pin arrival times.

FIG. 2A is an illustration of a sample circuit and pin arrival times. FIG. 2A also illustrates an issue with GBA's conservative nature, wherein optimization may stall under certain situations.

Gate (202) has two input pins, A (204) and B (206) and output pin O (208). The pin I1 (214), for example from an output D-flipflop, is connected to input pin A (204), the pin I2 (216) is connected to input pin B (206) and pin P (218), for example to an input D-flipflop is connected to output pin O (208). During an arrival time update at instance/logic gate output pin O (208), the following two conditions may occur at the same instant:

The nominal arrival time at pin O (208) is primarily correlated with input A (204) and the corresponding edge delay from A to O, as shown in the input A arrival time pdf (probability density function) (224); and The arrival time variation at pin O (208) is primarily correlated with input B (206), as shown in the input B pdf (226).

Thus, the two output pin worst case arrival time attributes, nominal arrival time and arrival time variation, are correlated separately between the two input pins A and B. Under this situation, optimization may stall as the circuit has to be optimized from a plurality of sources simultaneously given simplistic information from the GBA, as shown in the GBA arrival time pdf (228).

By contrast, a PBA removes such pessimism from the GBA, wherein different paths are generated through different inputs, such as from A (204) to O (208), or from B (206) to O (208). As shown in FIG. 2A, the arrival time at output pin O (208) becomes a path specific attribute, with a path from A to O arrival time pdf (234) and a path from B to O arrival time pdf (236), instead of relying on the simplistic GBA arrival time pdf (228) for gates (202). Thus, the timing optimization based on PBA may produce a circuit with faster speed.

Traditionally, PBA and batch/snapshot mode PBA implementations have been used for verification. Addressing how to apply PBA results earlier in design at circuit optimization is disclosed. The disclosed techniques are applicable for incorporation in placement and routing systems, for example and without limitation in AVATAR Aprisa, SYNOPSYS IC Compiler II, and CADENCE Innovus.

Figure 2B:
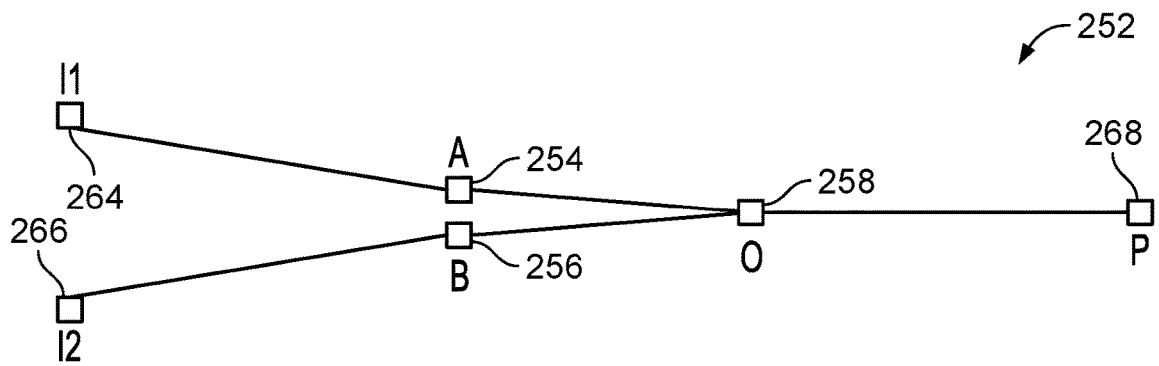
FIG. 2B is an illustration of a graph structure abstraction for the circuit in FIG. 2A.

FIG. 2B is an illustration of a graph structure abstraction for the circuit in FIG. 2A. In a GBA flow, the circuit (202) and net is abstracted into a graph structure (252). Each vertex in the graph (252) represents an instance pin in the design:

Pin A (204) by vertex A (254);
Pin B (206) by vertex B (256);
Pin O (208) by vertex O (258);
Pin I1 (214) by vertex I1 (264);
Pin I2 (216) by vertex I2 (266); and
Pin P (218) by vertex P (268).

The vertices in the graph are connected by edges. An edge can connect the input and output pins of the same instance, or logic gate. An edge may also connect the output of one instance to the input of another instance. For example, a PBA analysis grants separate path analysis for the A (254) to O (258) path and B (256) to O (258) path, denoted as a AOpba arrival time pdf for A-O and as a BOpba arrival time pdf for B-O. A GBA analysis may be thought of as a simplistic analysis being identical for all paths, thus O=max (AOpba, BOpba).

To provide an efficient PBA implementation for place and route optimization, an improved PBA database is disclosed. As used herein, the term database refers to any organized collection of data for processing, for example a data structure in memory such as a C++ class, a relational database, and/or a schemaless database. Besides using an existing GBA database, at least two fundamentals defined for the PBA database, shown here for example and without limitation as a C++ class, are:

```
class pbaPath {
// describe one timing path including launch clock, capture clock,
// and data path
...
};
and
class pbaPin {
// represents one physical pin in PBA database, holding path specific
// attributes for the pin, e.g. delay, transition, derate, arrival
// time, etc. One physical pin may map to multiple pbaPins in
// PBA database.
...
};
```

In one embodiment, an example GBA database class without limitation is:

```
// Top level class for GBA database
// GBA timing analysis manager for one scenario
class taMgr {
    dbScenario *_currScena;    // current scenario in timer
    taSDC *_sdc;               // Design constraint
    tdMgr *_td;                // GBA graph traverse manager
    taPowAPI *_powAPI;         // Power analysis manager
    taSocvm *_socvm;           // Statistical timing analysis manager
    dbProject *_project;       // The current design, including netlist,
                               // parasitic RC information, and so
                               // forth.
// Clock tree analysis related class
    taCTSGenMap *_ctsGenMap;
    taCTSMarkMap *_ctsMarkMap;
// number of path groups
    UInt _pathGroupNum;
// Class for GBA path report
    taCritPathCtrl *_critPathCtrl;
// Multithread analysis manager
    taThreadMgr *_thrdMgr[utThread::MAX_THREAD];
    pbaTiming* _pba;           // PBA analysis database
};
```

In one embodiment, the PBA database is described without limitation as:

```
// Top level class for PBA data base
// Each scenario has one pbaTiming. It holds all PBA
// information for current scenario.
```

```
class pbaTiming {
  pbaMgr *_setup; // PBA database for setup check
  pbaMgr* _hold; // PBA database for hold check
};
// This is 1-line definition for pbaPath list structure used in class pbaMgr
typedef typedSList<pbaPath> pbaPathSList;
class pbaMgr {
  ta: :DelayType _pbaType; // defines setup or hold check
// Following group of parameters defines how the PBA paths are collected from
// graph-based timing analysis results
  int _nworst;                       // defines number of paths for each unique
                                     // path ending register [Default 50]
  int _ maxPathPerGrp;               // max number of paths for each path group
                                     // [Default #of reg * _nworst]
  double _lowerSlackBound;           // path slack lower threshold,
                                     // [Default negative infinite]
  double _upperSlackBound;           // path slack upper threshold
                                     // [Default +100ps]
  bool _unconstrPath;                // defines if PBA database includes
                                     // unconstraint path, [Default false]
  bool _internalPathOnly;            // defines if PBA database only
                                     // includes register-to-register path
                                     // [Default false]
  // Following is pbaPath list in current pbaMgr
  pbaPathSList* _pbaPathList; // for MT
};
// This is a 1-line definition for list of pbaPin, used by class pbaPath
typedef typedSList<pbaPin> pbaPinSList;
// Following class defines one PBA path
class pbaPath {
  pbaPinSList *_pbaDataList;         // Data path pbaPin list
  pbaPinSList *_pbaLaunchList;       // Launch clock pbaPin list
  pbaPinSList *_pbaCaptureList;      // capture clock pbapin list
// Incremental PBA analysis begin pin. Incremental PBA update starting
// from this pin.
  pbaPin* _incrBeginPin;
  taClock* _launchClk;               // Defines pbaPath clock information
  taClock* _captureClk;
// clock uncertainty for current pbaPath
  float _clkUncertain;               // [Default 0]
// CRPR (Clock Reconvergence Pessimism Removal) value for current pbaPath
  float _crprVal;
// setup or hold constraint
  float _constraint;
// path PBA slack
  float _slack;
};
class pbaPin {
// The pbaPath current pbaPin associated with
  pbaPath *_path;
// The physical pin for current pbaPin
  dbPin *_pin;
// Float array hold pbaPin attributes on current pbaPath, including:
  // float _pbaTran;                 // pbaPin transition
  // float _pbaDly;                  // pbaPin delay
  // float _derate;                  // pbaPIn nominal pbaPin derate
  // float _pbaDDly;                 // PBA delta-delay
  // float _pbaDTran;                // PBA delta-tran
  // float _arrTime;                 // pbaPin arrival time
  // float _reqTime;                 // pbaPin require time
// Following variables for statistical timing analysis
  // float _sigmaRatio;
  // float _sigma;
  // float _arrTimeVar;    // arrival time variance
  float *_dataArr;
};
```

In each case, most data fields are calculated and filled in after a pbaPath analysis.

The PBA database includes a group of timing paths from GBA analysis. There are different methods to collect such paths. Parameters provided to control the paths to be included in the PBA database comprise:

Path slack thresholds, such as upper and lower bounds; and/or

The number of paths at each unique ending pin.

Figure 3A:
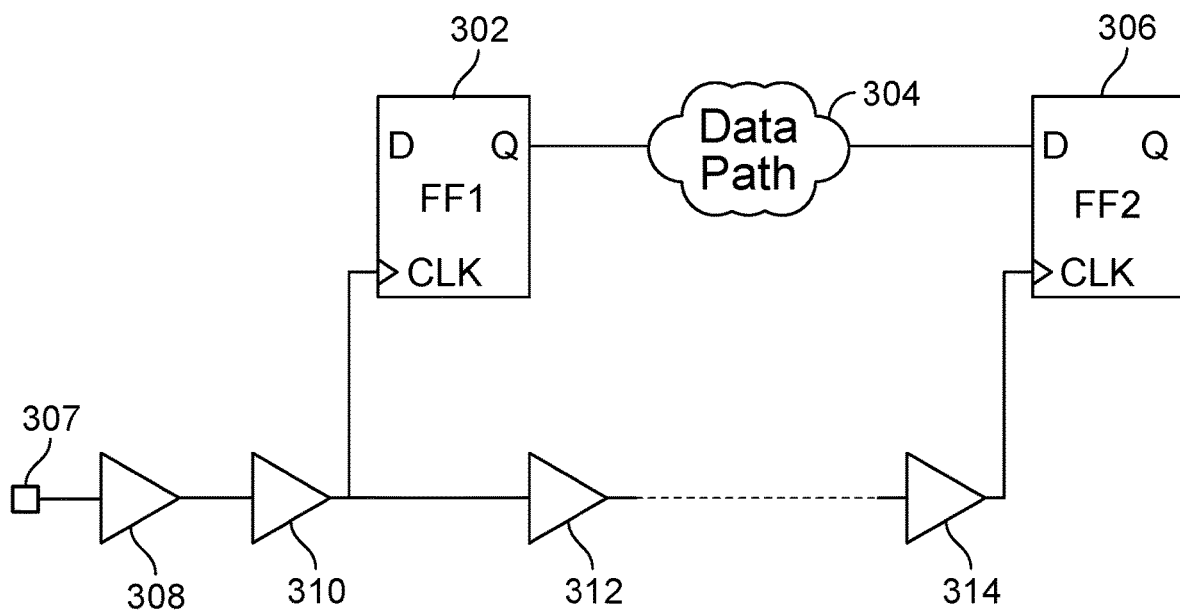
FIG. 3A is an illustration of an example timing path.

FIG. 3A is an illustration of an example timing path. FIG. 3A depicts two D-flipflops, FF1 (302) and FF2 (306), with data path/logic (304) connected between the Q output of FF1 (302) and D input of FF2 (306). The clock line including buffers (308), (310), (312), and (314), indicate various physical and virtual timing delays in the clock line from the boundary master clock pin (307).

Figure 3B:
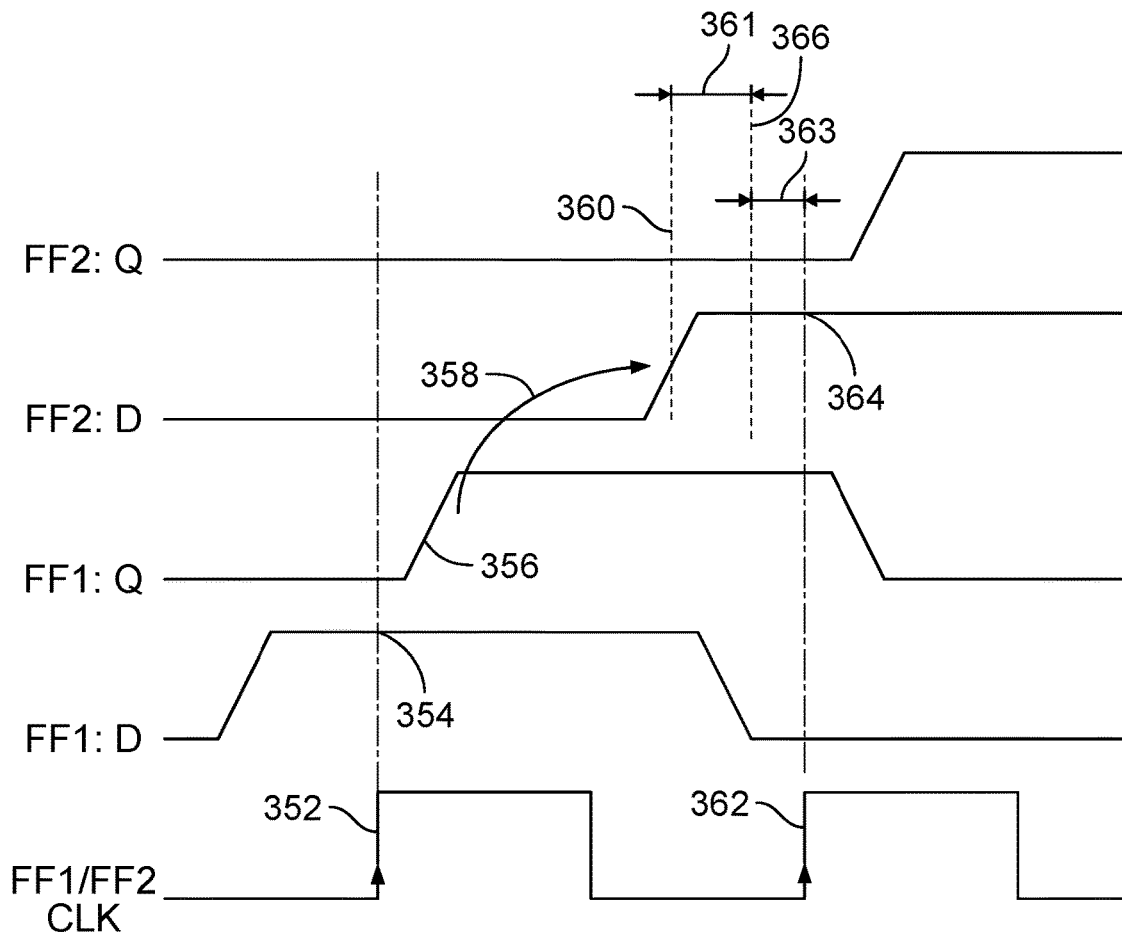
FIG. 3B is an illustration of a corresponding timing diagram for the timing path in FIG. 3A to illustrate STA concepts.

FIG. 3B is an illustration of a corresponding timing diagram for the timing path in FIG. 3A to illustrate STA concepts. To simplify the illustration, the CLK edge is shown in a single waveform, although they will be explained as local to the relevant D-flipflop. Clock launch edge (352) for the CLK of FF1 (302) triggers a data launch event (354) at FF1 (302), which has a non-zero delay (356) between the CLK of FF1 (302) and the Q output of FF1 (302). The launching clock as described herein includes the clock path from the master clock to the first register (302). The delay (358) of the data path (304) eventually asserts the D input of FF2 (306) at what is referred herein as the arrival time (360). In relation to the clock capture edge (362) for the CLK of FF2 (306), FF2 requires what is referred herein as the setup time period (363) to successfully settle a data capture event (364) at FF2 (306). The capture clock as described herein includes the clock path from the master clock to the capture register (306). The difference between the capture edge time (362) less the setup time period (363) is referred herein as the required time (366). The time period between the required time (366) and arrival time (360) is referred herein as the slack (361).

Each pbaPath represents one specific timing path, and includes three components, wherein each component is described as a list of pbaPins:
- pbaLaunchClockList: Starts from boundary master clock pin (307) and ends at launch register (302) CLK clock pin;
- pbaDataPathList: Starts from launch register (302) CLK pin and ends at capture register (306) D input pin via the data path (304); and
- pbaCaptureClockList: Starts from boundary master clock pin (307) to capture register (306) CLK clock pin.

One physical pin in the design may be included by multiple pbaPins in the PBA database if there are multiple pbaPaths going through the same pin. From a PBA analysis, the same pin may have path specific values such as delay, transition, delta-delay, derate, and arrival time. These path specific attributes may be assigned to the pbaPin associated with the pbaPath.

Thus, all pbaPaths in PBA database may be independent with each other. The PBA analysis exploits a multithread programming technique to achieve highest possible processor thread efficiency.

In order to apply PBA results to guide circuit optimization efficiently, a "PBA incremental update" capability is used when a place and route optimizer makes changes to the design. The "incremental update" will collect a set of connected pins to form a window. Using such a "Quick PBA" to perform an analysis on the pins/paths associated with the window under the assumption that optimization will have lower impact outside the window is disclosed. Using a simpler data structure for a PBA, without necessarily using a graph is disclosed. The simpler data structure decreases analysis time while making it simple to do path addition, insertion, and deletion.

In one embodiment, a heap structure associated with a physical pin is created to address this. The PBA database is built during a PBA timing update for the whole design. A heap is a tree structure, wherein each vertex in the tree is a PBA pass. The heap for a given physical pin holds all the pbaPaths that go through the given physical pin. In one embodiment, the heap is sorted such that the top of the tree is the path with the worst timing. In one embodiment, a heap sort algorithm is used for sorting. Using a heap data structure, the following operations may become more efficient:
- Insert new pbaPath into heap;
- Delete pbaPath from heap; and/or
- Fetch worst slack pbaPath from heap for a worst negative slack (WNS)/total negative slack (TNS) update.

In one embodiment, the top of each heap for a pin is used to order the rest of the analysis and/or optimization.

Path-Based Analysis and Optimization.

An incremental PBA is disclosed. In a traditional place and route flow, circuit optimization relies on a GBA timing engine from placement to a detail route stage. At the end of a regular detail route stage, a user may continue applying a PBA based optimization to gain better timing. A user may also choose PBA based power/area optimization to achieve smaller power consumption or chip area.

Local Evaluation Window Step.

In one embodiment, a local evaluation window is used, wherein a local evaluation window is a small subset of connected circuits, for example a spatial window in the design, in which an optimizer may try certain moves within to improve circuit performance such as timing, power, and/or area. As used herein, the term move refers to any proposed change to be evaluated against circuit performance. In one embodiment, a local evaluation window may be identified and/or used along a path that has negative slack, and that needs to be corrected.

FIG. 4 is an illustration of a local evaluation window. The local evaluation window may be defined using some boundary pins:
- Window begin pins (402), a window left boundary; and
- Window end pins (404), a window right boundary.

FIG. 4 an optimizer works on instance I2. The local evaluation window boundary begin pin (402) may be defined at the output of instance I1. The end pins (404) may be defined as the input pins of instance I3 and I4.

Inside a local evaluation window (406), an optimizer may try at least one type of optimization move:
- sizing. For example, under local eval the optimizer may try micro candidates including physically sizing ×2, ×4, ×6, and so forth;
- instance insertion. For example, a buffer insertion;
- instance deletion. For example, a buffer deletion; and/or
- move instance physical location.

In one embodiment, the local window provides a 'sandbox' for the optimizer to try different moves and review local changes in timing based on the incremental PBA. Improving timing on a target pin may degrade the timing on another pin and/or interfere with another pin/circuit in terms of space limitations, cross talk, and/or noise. Thus, the optimizer should make decisions on such a tradeoff.

Incremental PBA Database Update Step.

After constructing a local evaluation window as shown for example in FIG. 4, all begin and end pins associated with the window are collected. A heap is formed for each of the pins so that all pbaPaths that go through the local evaluation window may be assembled. Optimizer moves have major impacts only on this group of pbaPaths.

Thus, instead of updating the entire PBA database, slack is recalculated only for this group of pbaPaths containing pins inside the window for the optimizer to determine whether a proposed move improves or degrades circuit performance. During incremental PBA analysis, a multithreaded programming technique may still be used to reduce execution time, wherein N-threads analyze N-paths simultaneously.

Local Incremental PBA Evaluation and Update Step.

Therefore, for a local pbaPath incremental analysis, the whole path does not need to be analyzed. Instead, the begin pin (402) of current local evaluation window (406) is all that is required to start. An assumption is made that the upper stream pbaPin timings are not affected by a proposed optimizer move. When working on the same instance, for example for sizing, an optimizer may try multiple candidates, and this is referred to as "local incremental evaluation".

For local PBA incremental evaluation, all that is required is to find the best candidate among multiple choices. In order to further speedup, the local PBA incremental evaluation for each pbaPath stops at local evaluation window end pins (404). In one embodiment, the timing of the group of pbaPaths touched by local PBA incremental evaluation is not "clean", such that timing of part of the path is not correct. Because local evaluation stops at a window boundary, for example the end pins (404), the timing including delay, transition, arrival time, and so on downstream of the end pins (404) are not updated, and that portion of timing may not be correct and/or outdated.

Global Incremental PBA Evaulation and Update Step.

Based on quick local evaluation, the optimizer decides the best candidate, and thereafter a global incremental PBA analysis is called. That is, all the paths affected by the current optimizer move are updated, starting from the window begin pin (402) until the end of the path. After this global PBA incremental evaluation substep, the timing of all the paths in the PBA database are considered "clean".

Under certain circumstances the local PBA evaluation may show improvement in circuit performance. After a global PBA evaluation, the same move may turn out to degrade circuit performance. In this case, the optimizer will undo the move and call PBA global evaluation again to restore the PBA database to its original status before that considered move.

PBA Power and Area Optimizer Step.

During PBA database construction, a user may define a slack upperbound. In one embodiment, a +100 ps slack may be used as a default threshold. The PBA database then collects only GBA paths whose slack are worse than this threshold. For timing optimization, such a PBA database may serve well.

However, for power/area optimization, as the optimizer works on instances with very positive slack, such instances/pins may not be collected within the PBA database. Put another way, timing optimization attempts to fix all negative slack, with a positive upper bound, for example +100 picoseconds. The incremental PBA for timing optimization focuses on "critical path" analysis. As used herein, the term "critical path" includes any path constraining performance most acutely, for example by having the worst/lowest negative slack, largest delay and/or worst timing. In one embodiment, as timing optimization progresses, the critical path of a heap is the next path to be addressed by timing optimization for that heap.

By contrast, power/area optimization deals with overdesign where there is very positive slack, for example +200 to +300 picoseconds, and by optimizing for lower positive slack, power and/or area may be conserved while keeping slack more mildly positive say +100 picoseconds. The incremental PBA for power/area optimization focuses on "non-critical path" analysis. As used herein, the term "non-critical path" includes any path that constraining performance least acutely, for example by having the worst/highest positive slack, smallest delay and/or best timing. In one embodiment, as power/area optimization progresses, the non-critical path of a heap is the next path to be addressed by power/area optimization for that heap.

The optimizer thus selects a group of candidate pins that are used during power/area optimization. These pins are passed to the incremental PBA engine. If a candidate pin does not exist in the collected PBA database, a path with a worst GBA slack is dynamically fetched that goes through this pin. The group of these newly added pbaPaths may be analyzed using a multithreaded PBA engine before a power/area optimization. They may then be inserted into the PBA database.

During power/area optimization, optimizer may try different moves such as:

Size down, for example sizing down a feature size; and/or

Swap to a high Vt cell.

As each of the candidate pins have at least one pbaPath in the PBA database, the incremental PBA engine should determine whether a move will degrade PBA timing or not.

PBA-GBA Hybrid Analysis.

Scenario dependent PBA-GBA hybrid analysis is disclosed. As described above, a PBA database may only cover a portion of the design. Thus, timing degradation of pins outside the PBA database may not be monitored by an incremental PBA update. This may introduce a timing jump such as a larger timing violation after an optimization move. This may happen during a hold timing fix or a power/area optimization stage for designs with multiple scenarios, such as those in multi-corner multi-mode (MCMM).

PBA-GBA Hybrid Analysis for Hold Fix:

A scenario may have one well defined function mode and one parasitic corner. Under the assumption that a given design has one scenario A with a hold violation, the typical hold fix may slow down the path with the hold violation. If another scenario B has a PBA database that does not cover this path, the hold fix in scenario A may severely degrade a setup timing in scenario B.

One apparent solution addressing this problem is dynamically creating new setup paths to cover all the paths with hold violation in the PBA database. This approach may reduce the possibility, but it may not fully prevent such a timing jump from happening. This type of solution consumes more memory and CPU time as more paths need to be analyzed.

By contrast, a scenario dependent PBA-GBA hybrid analysis as disclosed may prevent such a timing jump problem with far less memory/CPU overhead. Typical designs in a place and route flow contain multiple scenarios; some scenarios have large hold timing violation, and some have large setup violation. Before a hold timing fix stage, an analyzer may automatically select one scenario with a large setup violation coverage and mark the scenario as a hybrid scenario.

The PBA-GBA hybrid flow does not use a hybrid scenario GBA timing directly during an incremental PBA flow. After a whole design PBA analysis for each scenario, the analyzer calculates worst PBA versus worst GBA slack differences at each path ending pin for each path group. It may then apply the differences as slack relax margin to each GBA timing path. The calibrated GBA timing shall set identical WNS/TNS as its PBA results. The calibrated GBA timing in a hybrid scenario is only for a purpose of constraint, and may not be involved in optimization. Other normal scenarios still use the PBA timing to perform a timing fix. Optimization is still based on PBA timing results, while the hybrid scenario serves as a fallback/guard to prevent a timing jump caused by changes from an incremental PBA move.

If necessary, the analyzer may select multiple scenarios as hybrid scenarios. Alternately, if a system has more available memory, the analyzer may create an extra scenario to act as a hybrid scenario and keep all original scenarios as a normal scenario for PBA optimization. Such an analyzer may be embedded within a general place and route tool/implementation to prevent potential timing jump caused by incremental PBA optimization.

PBA-GBA Hybrid Analysis for Power/Area Optimization.

As described above, the optimization moves commonly used by power/area optimization are to size features down and/or swap to a high Vt cell. These moves typically slow down a circuit. As described above, a PBA database may not include all paths in a design. Some non-critical path initial positive slacks may become negative during a PBA power/area stage. By itself, an incremental PBA analysis may not catch such degradation as these paths are not included in the PBA database. The PBA-GBA hybrid analysis may thus be adopted during a PBA power/area optimization to prevent timing jumps.

Figure 5:
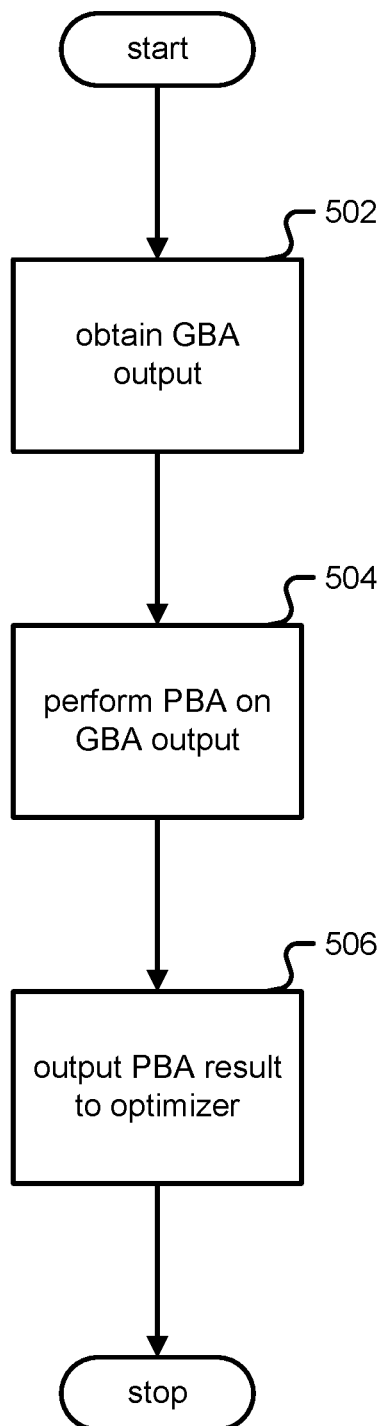
FIG. 5 is a flow chart illustrating an embodiment of a process for incremental path-based analysis.

FIG. 5 is a flow chart illustrating an embodiment of a process for incremental path-based analysis. In step 502, GBA output is obtained. In one embodiment, a GBA timing engine is used from the placement to detail route stage. In one embodiment, the GBA output obtained comprises timing information pertaining to a plurality of paths in an integrated circuit. In one embodiment, at least some of the plurality of paths share a same pin. In one embodiment, an incremental GBA analysis is used.

In step 504, PBA is performed on the GBA output from step 502. Note that this step does not introduce any overhead on memory because the GBA database is in memory regardless. Performing PBA on the GBA output is done to analyze timing of the plurality of paths and generate a set of improved timing results, wherein the physical measurements used by the PBA are more accurate than the physical measurements used by the GBA. In one embodiment, performing the PBA includes using a database comprising information pertaining to the plurality of paths. In one embodiment, a heap is created for a pin based at least in part on using the PBA result. In one embodiment, an optimization move is selected and/or performed on the PBA result. In one embodiment, local evaluation is performed on the PBA result.

In step 506, the PBA result is output to an optimizer to automatically adjust the circuit. In one embodiment, feedback is provided to the optimizer for paths affected by an optimization move.

Figure 6:
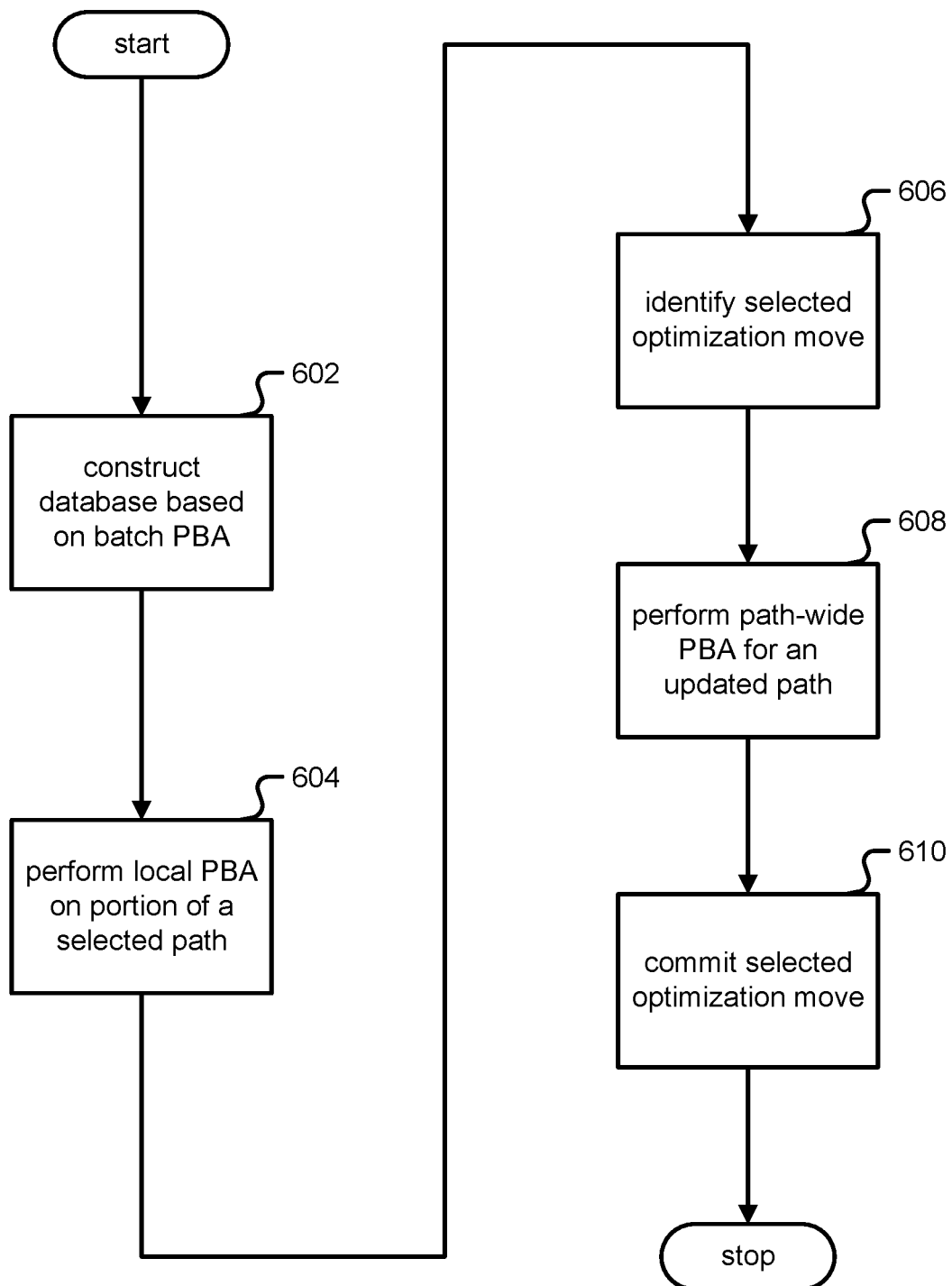
FIG. 6 is a flow chart illustrating an embodiment of a process for a local evaluation window in incremental PBA.

FIG. 6 is a flow chart illustrating an embodiment of a process for a local evaluation window in incremental PBA. In step 602, a database is constructed based on a batch/snapshot PBA performed on a plurality of paths of an integrated circuit. In one embodiment, constructing comprises creating a heap for a pin, wherein the heap comprises path information of one or more paths associated with the pin.

In step 604, a local PBA is performed on a portion of a selected path, for example on the portion indicated by local evaluation window (406) in FIG. 4. In step 606, a selected optimization move is identified on the portion of the selected path, based on a result of the local PBA that best meets a set of constraints. In one embodiment, the selected path is a critical path.

In one embodiment, identifying a selected optimization move comprises selecting optimization for meeting timing requirements in the event the selected path is a critical path. In one embodiment, the selected path is a non-critical path. In one embodiment, identifying a selected optimization move comprises selecting optimization for optimizing power and area in the event the selected path is a non-critical path with positive slack.

In step 608, a path-wide PBA is performed for an updated path that is based on the selected path incorporating the selected optimization move. In one embodiment, a local update from the begin pin (402) to the end pin (404) is performed with local/relative accuracy for optimization. In step 610, the selected optimization move is committed in a netlist associated with the integrated circuit. In one embodiment, a global update for a given path may be performed from the begin pin (402) to the end of the path is performed with global/overall accuracy for optimization.

Figure 7:
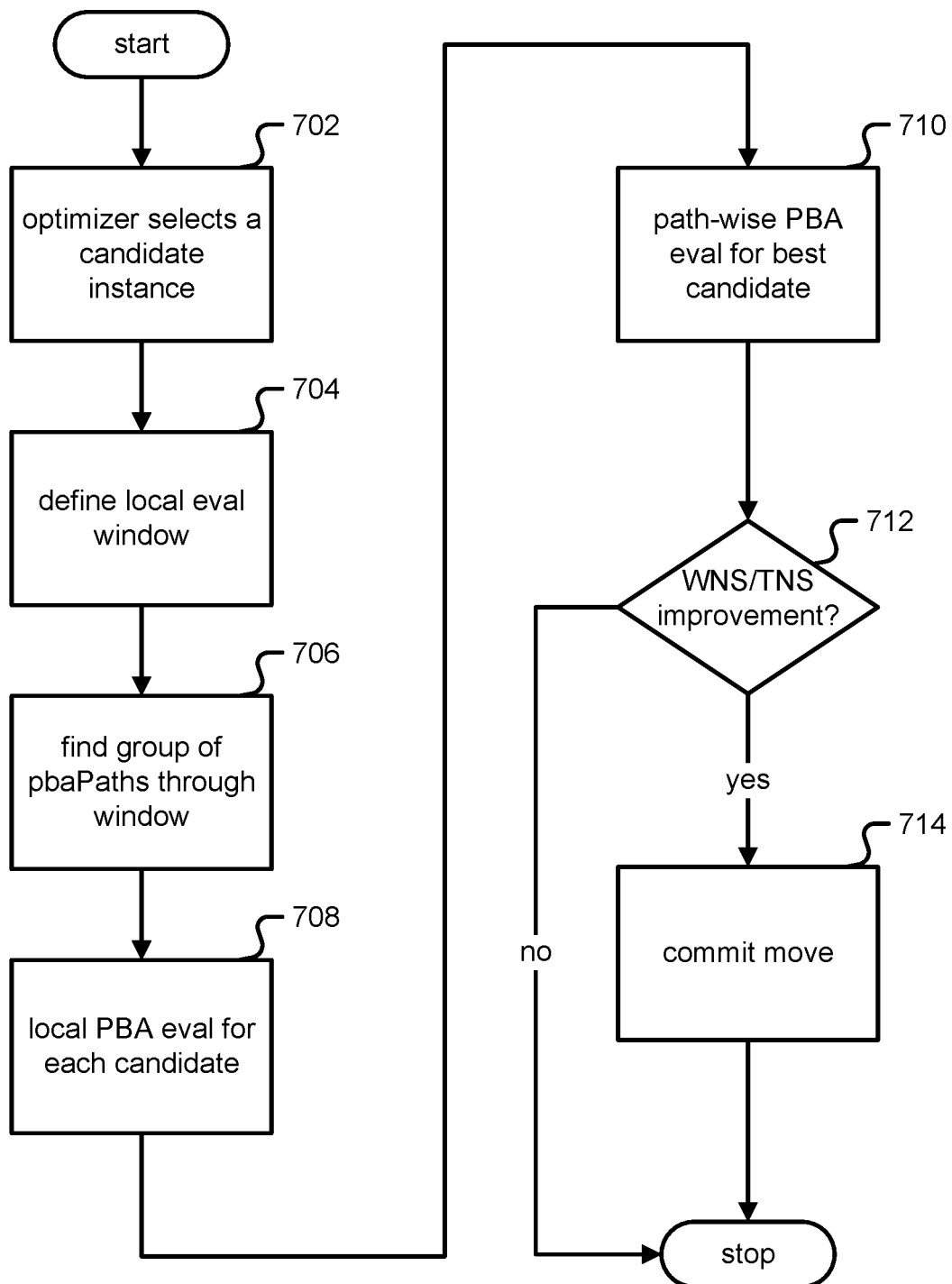
FIG. 7 is a flow chart illustrating an embodiment of a process for an optimizer move using incremental path-based analysis.

FIG. 7 is a flow chart illustrating an embodiment of a process for an optimizer move using incremental path-based analysis. In one embodiment, the process of FIG. 7 is part of step 504 in FIG. 5. In step 702, an optimizer selects a candidate instance/gates of a netlist for place and route optimization. In step 704, a local evaluation window (406) is defined via its begin pins (402) and end pins (404) as described above and with FIG. 6. In step 706, a group of pbaPaths through the local evaluation window (406) are found.

In step 708, a local PBA evaluation is analyzed for each candidate iteratively. In step 710, the best candidate from step 708 is used for a path-wise PBA evaluation. In step 712, a decision is made based on whether there is improvement in worst negative slack and/or total negative slack; in the event there is improvement, the move is committed, and in the event there is no meaningful improvement, optimization is skipped for the current instance/gates. The optimizer may select another candidate instance, starting again at step 702.

Examples of techniques for a batch PBA include the following pseudocode without limitation:

// Batch PBA analysis routines
void pbaTiming::UpdateTiming(bool forceUpdate)
{
   // Batch setup PBA analysis in current scenario GetSetupPba( )→UpdateTiming( );
   // Batch hold PBA analysis in current scenario GetHoldPba( )→UpdateTiming( );
}
// Batch PBA (setup/hold) analysis
void pbaMgr::UpdateTiming( )
{
   // Multithread PBA analysis initialization InitPbaThread( );
   // Collect critical paths from graph-based timing analysis CollectPbaCritPaths( );
   // Multithread PBA analysis for all the pbaPaths PerformPbaAnalysisMT( );
   // Build path group for WNS/TNS calculation BuildPbaPathGroupMap( );
   // Calcuate PBA WNS (worst-negative-slack) and TNS (total-negative-slack) CalcPbaWNSTNS( );
   // For each path ending register & each path group, calculate PBA and GBA
   // worst slack difference. Use this difference to calibrate hybrid
   // scenario GBA timing.
   UpdateGbaSlkMargin( );
}

Examples of techniques for an incremental PBA include the following pseudocode without limitation:

```
// Incremental PBA analysis routines
void taInc: :IncrUpdatePbaTiming(
    dbPinSet *windowBeginPins,      // incremental PBA analysis window begin pins
    dbPinSet *windowEndPins         // incrementla PBA analysis window ending pins
    )
{
    // Synchronize PBA database due to current optimization move
    SyncPbaDataBase( );
    // Incremental setup PBA analysis
    GetPbaMgr(ta: :SETUP)->UpdateTiming(windowBeginPins, windowEndPins);
    // Incremental hold PBA analysis
    GetPbaMgr(ta: :HOLD)->UpdateTiming(windowBeginPins, windowEndPins);
}
// Incremental PBA analysis routine
// Update path timing only if pbaPath goes through the window
// Window boundary are defined by beginPins and endPins
bool pbaMgr: :UpdateTiming(dbPinSet* beginPins, dbPinSet *endPins)
{
    // Gather list of pbaPaths that going through current window
    // For each pathPath, the incremental analysis begin pin on
    // the path is also marked in this routine.
    GetPbaPathFromWindow(beginPins, endPins, &pbaPathSList);
    // Incremental update list of pbaPaths. For each pbaPath, only
    // update the path after incremental begin pin on the pbaPath.
    UpdateTiming(&pinPathSList);
}
```

Figure 8:
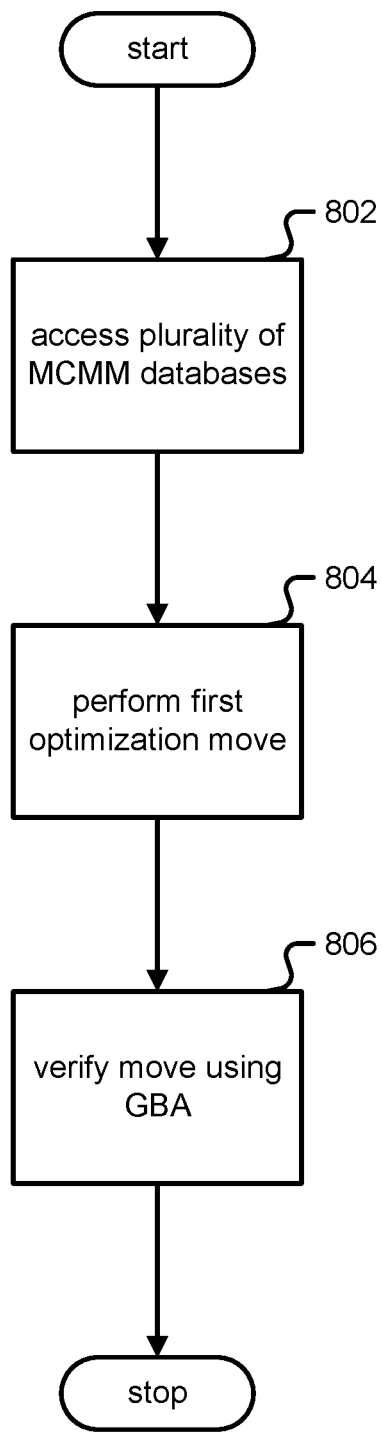
FIG. 8 is a flow chart illustrating an embodiment of a process for PBA-GBA hybrid analysis.

FIG. 8 is a flow chart illustrating an embodiment of a process for PBA-GBA hybrid analysis. In step 802, a plurality of MCMM databases are accessed. In one embodiment, at least one of the plurality of MCMM databases corresponds to a first optimization scenario, and at least one of the plurality of MCMM databases corresponds to a second optimization scenario. In one embodiment, the first optimization scenario is a power and/or area optimization scenario. In one embodiment, the second optimization scenario is a timing optimization scenario.

In step 804, a first optimization move is performed on paths in the first optimization scenario. In step 806, the move is verified using GBA on paths in the second optimization scenario to determine that the move does not cause timing violations outside an MCMM database associated with the first optimization scenario. In one embodiment, the first optimization move is verified using PBA on paths associated with the first optimization scenario.

Figure 9:
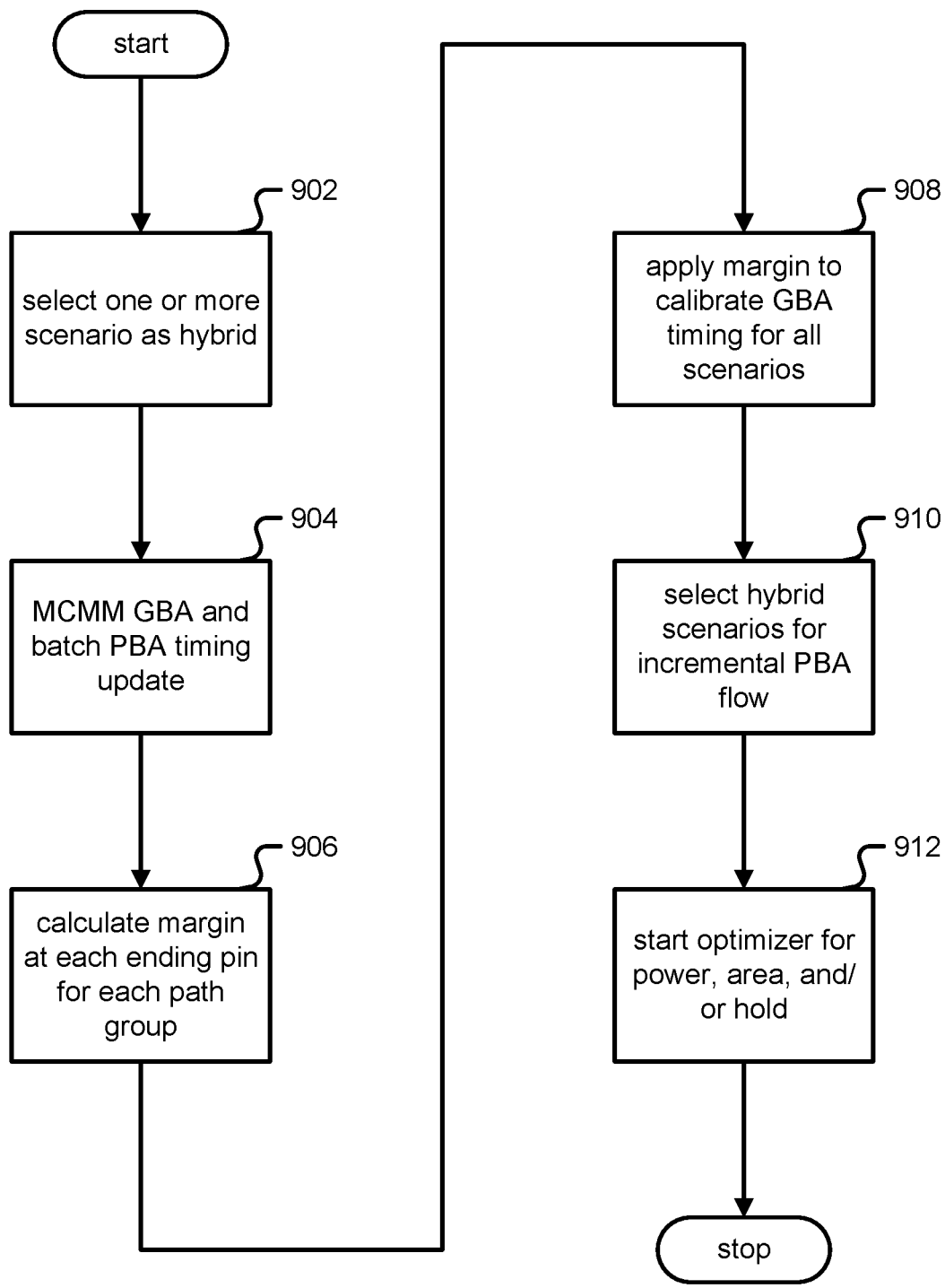
FIG. 9 is a flow chart illustrating an embodiment of a process for a GBA hybrid enhancement.

FIG. 9 is a flow chart illustrating an embodiment of a process for a GBA hybrid enhancement. In step 902, one or more scenarios are selected as hybrid. As described above, a hybrid scenario is a scenario selected as prone to a timing jump after an optimizer move, for example with multiple modes. In step 904, an MCMM GBA and batch PBA timing update is performed as the baseline.

In step 906, as described above the PBA optimization flow does not use GBA timing directly. For each unique path ending pin per path group, slack margin is calculated as:

slack_margin=worst_pba_slack−worst_gba_slack

In step 908, slack margin is applied to calibrate GBA timing for all scenarios. After this calibration, the initial GBA timing WNS and/or TNS are set to their associated PBA timing results. In step 910, for the one or more scenarios selected as hybrid, calibrated GBA timing is checked for incremental PBA power/area/hold optimization flow to prevent timing degradation.

In step 912, the optimizer is started for power, area, and/or hold timing. Thus both PBA and/or hybrid scenarios have better timing during optimization compared to a traditional GBA flow. Using a hybrid approach better guarantees the PBA flow to produce better final quality of results than a regular GBA optimization flow.

Experimental Results

For a sample design with six scenarios and around four million instances, the design is saved after regular place and route stages. The initial PBA timing and power of the design is: WNS [0.607:0.073] TNS [56.080:830.497] Power [2167].

A traditional GBA for timing and power optimization phases are applied to above design. One PBA batch/snapshot update obtains PBA timing for comparison: WNS [0.394: 0.107] TNS [27.378:353.580] Power [2117]. The execution time for the GBA timing and power optimization is ~10 hours.

By contrast, an incremental PBA timing and power optimization flow results in a superior PBA timing and power: WNS [0.389:0.033] TNS [13.108:172.525] Power [2080], with an execution time of only ~28 hours for the incremental PBA flow run.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
   obtaining a graph-based analysis (GBA) output comprising timing information pertaining to a plurality of paths in an integrated circuit;
   performing a path-based analysis (PBA) on the GBA output to analyze timing of the plurality of paths and generate a set of improved timing results, wherein a PBA set of physical measurements used by the PBA are more accurate than a GBA set of physical measurements used by the GBA;
   outputting the PBA result to an optimizer to automatically adjust the circuit and
   creating a heap data structure associated with a physical pin, wherein:
      the heap data structure comprises a tree structure;
      the heap data structure holds all PBA paths from the PBA result that go through the physical pin; and the heap data structure is sorted using a heap sort algorithm such that a top of the tree structure is a worst timing PBA path.

2. The method of claim 1, wherein at least some of the plurality of paths share a same pin.

3. The method of claim 1, wherein performing the PBA includes using a database comprising information pertaining to the plurality of paths.

4. The method of claim 1, further comprising creating a heap for a pin based at least in part on using the PBA result.

5. The method of claim 1, further comprising selecting an optimization move on the PBA result.

6. The method of claim 1, further comprising performing local evaluation on the PBA result.

7. The method of claim 1, further comprising providing feedback to the optimizer for paths affected by an optimization move.

8. A system, comprising:
a processor configured to:
obtain a graph-based analysis (GBA) output comprising timing information pertaining to a plurality of paths in an integrated circuit;
perform a path-based analysis (PBA) on the GBA output to analyze timing of the plurality of paths and generate a set of improved timing results, wherein a PBA set of physical measurements used by the PBA are more accurate than a GBA set of physical measurements used by the GBA;
output the PBA result to an optimizer to automatically adjust the circuit; and
create a heap data structure associated with a physical pin, wherein:
the heap data structure comprises a tree structure;
the heap data structure holds all PBA paths from the PBA result that go through the physical pin; and
the heap data structure is sorted using a heap sort algorithm such that a top of the tree structure is a worst timing PBA path; and
a memory coupled to the processor and configured to provide the processor with instructions.

9. The system of claim 8, wherein at least some of the plurality of paths share a same pin.

10. The system of claim 8, wherein performing the PBA includes using a database comprising information pertaining to the plurality of paths.

11. The system of claim 8, wherein the processor is further configured to create a heap for a pin based at least in part on using the PBA result.

12. The system of claim 8, wherein the processor is further configured to select an optimization move on the PBA result.

13. The system of claim 8, wherein the processor is further configured to perform local evaluation on the PBA result.

14. The system of claim 8, wherein the processor is further configured to provide feedback to the optimizer for paths affected by an optimization move.

15. A computer program product, the computer program product being embodied in a non-transitory computer readable storage medium and comprising computer instructions for:
obtaining a graph-based analysis (GBA) output comprising timing information pertaining to a plurality of paths in an integrated circuit;
performing a path-based analysis (PBA) on the GBA output to analyze timing of the plurality of paths and generate a set of improved timing results, wherein a PBA set of physical measurements used by the PBA are more accurate than a GBA set of physical measurements used by the GBA;
outputting the PBA result to an optimizer to automatically adjust the circuit; and
creating a heap data structure associated with a physical pin, wherein:
the heap data structure comprises a tree structure;
the heap data structure holds all PBA paths from the PBA result that go through the physical pin; and
the heap data structure is sorted using a heap sort algorithm such that a top of the tree structure is a worst timing PBA path.

16. The computer program product of claim 15, wherein at least some of the plurality of paths share a same pin.

17. The computer program product of claim 15, wherein performing the PBA includes using a database comprising information pertaining to the plurality of paths.

18. The computer program product of claim 15, further comprising computer instructions for creating a heap for a pin based at least in part on using the PBA result.

19. The computer program product of claim 15, further comprising computer instructions for selecting an optimization move on the PBA result.

20. The computer program product of claim 15, further comprising computer instructions for performing local evaluation on the PBA result.

* * * * *